(12) United States Patent
Jia et al.

(10) Patent No.: US 10,884,291 B2
(45) Date of Patent: Jan. 5, 2021

(54) TRANSPARENT DISPLAY DEVICE AND CONTAINER

(71) Applicants: Beijing BOE Technology Development Co., Ltd., Beijing (CN); BOE Technology Group Co., Ltd., Beijing (CN)

(72) Inventors: Nanfang Jia, Beijing (CN); Long Wang, Beijing (CN); Guangkui Qin, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/596,963

(22) Filed: Oct. 9, 2019

(65) Prior Publication Data
US 2020/0110314 A1    Apr. 9, 2020

(30) Foreign Application Priority Data

Oct. 9, 2018    (CN) .......................... 2018 1 1173933

(51) Int. Cl.
*G02F 1/13357*    (2006.01)

(52) U.S. Cl.
CPC .. *G02F 1/133621* (2013.01); *G02F 1/133611* (2013.01); *G02F 1/133615* (2013.01)

(58) Field of Classification Search
CPC ......... G02F 1/133621; G02F 1/133615; G02F 1/133611
USPC ........................................................... 349/61
See application file for complete search history.

(56) References Cited

U.S. PATENT DOCUMENTS

| | | | | |
|---|---|---|---|---|
| 2013/0293788 | A1* | 11/2013 | Shimizu | G02B 6/0055 348/739 |
| 2015/0054863 | A1* | 2/2015 | Tanaka | G09G 3/3406 345/691 |
| 2019/0302343 | A1* | 10/2019 | Okuyama | G02B 6/0028 |

* cited by examiner

*Primary Examiner* — Nathanael R Briggs
*Assistant Examiner* — William D Peterson
(74) *Attorney, Agent, or Firm* — Nath, Goldberg & Meyer; Joshua B. Goldberg

(57) ABSTRACT

The present disclosure provides a transparent display device, including a transparent display panel and at least one full color light source. The transparent display panel includes a first substrate and a second substrate provided opposite to each other, and a polymer liquid crystal mixed layer located therebetween. The light source is located at a side of the first substrate distal to the second substrate, and an orthographic projection of the light source on a plane where the first substrate is located is outside the first substrate. The light source is configured to emit light of at least two colors toward the transparent display panel in a time division manner.

6 Claims, 4 Drawing Sheets

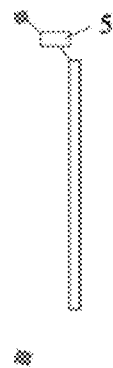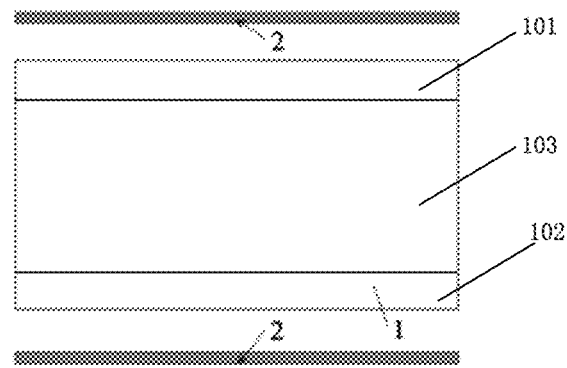
Fig. 1(a)　　　　　Fig. 1(b)
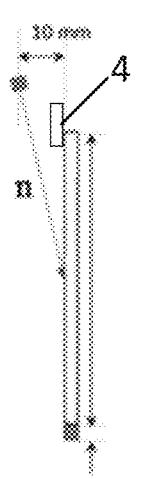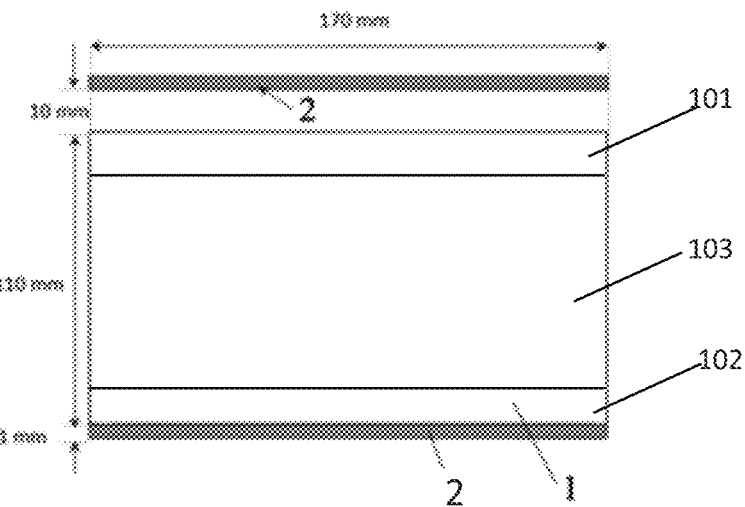
Fig. 2(a)　　　　　Fig. 2(b)

TRANSPARENT DISPLAY DEVICE AND CONTAINER

CROSS-REFERENCE TO RELATED APPLICATIONS

The present application claims the priority of Chinese Patent Application No. 201811173933.5, filed on Oct. 9, 2018, titled "TRANSPARENT DISPLAY DEVICE AND CONTAINER", the contents of which are incorporated herein in their entirety by reference.

TECHNICAL FIELD

The present disclosure relates to the field of display technology, and in particular, relates to a transparent display device and a container.

BACKGROUND

Transparent display panels have begun to enter public sight. When applying a pixel voltage to pixels in the transparent display panel, the transparent display panel can display information, and a user can see an actual scene on the back through the transparent display panel; and when the pixel voltage is not applied to the pixels, the transparent display panel is just like a piece of completely transparent glass, the user can see the actual scene on the back through the transparent display panel.

SUMMARY

According to a first aspect of the present disclosure, there is provided a transparent display device, which includes:
a transparent display panel, including:
a first substrate and a second substrate provided opposite to each other;
a polymer liquid crystal mixed layer, located between the first substrate and the second substrate; and
at least one full color light source, located at a side of the first substrate distal to the second substrate, an orthographic projection of the at least one full color light source on a plane where the first substrate is located is outside the first substrate, and the at least one full color light source is configured to emit light of at least two colors toward the transparent display panel in a time division manner.

In some embodiments, a normal line of a light exiting surface of the at least one full color light source is directed toward a center line of the transparent display panel, and the center line of the transparent display panel is parallel to a direction in which the at least one full color light source is arranged along a side of the transparent display panel.

In some embodiments, the at least one full color light source is a LED line light source, and an orthographic projection of the LED line light source on the plane where the first substrate is located is outside an outermost side edge of the first substrate.

In some embodiments, the at least one full color light source includes two LED line light sources provided opposite to each other, an orthographic projection of one of the LED line light sources on the plane where the first substrate is located is outside one outermost side edge of the first substrate, and an orthographic projection of the other of the LED line light sources on the plane where the first substrate is located is outside an outermost side edge opposite to the one outermost side edge.

In some embodiments, the transparent display device further includes a drive control circuit, which is connected to the at least one full color light source and the transparent display panel, and is configured to control a refresh frequency of the at least one full color LED light source to be equal to a frequency of a drive voltage data signal of the transparent display panel.

In some embodiments, the transparent display device further includes at least one shading member provided correspondingly to the at least one full color light source, wherein the at least one shading member is disposed at a side of the transparent display panel proximal to the respective one of the at least one full color light source, and an orthographic projection of the at least one full color light source on the plane where the first substrate is located is within an orthographic projection of the at least one shading member on this plane, respectively.

In some embodiments, each of the at least one full color light source includes a plurality of LED light sources of different colors, or an LED light source emitting light of a plurality of different colors.

In some embodiments, the polymer liquid crystal mixed layer includes polymer stabilized liquid crystal or polymer dispersed liquid crystal, and a response time of the polymer stabilized liquid crystal or the polymer dispersed liquid crystal is smaller than a light emitting time of each color in each frame in a field sequential display mode.

According to a second aspect of the present disclosure, there is provided a container, which includes a storage space for accommodating an object, wherein the container further includes the transparent display device according to any one of the foregoing embodiments of the present disclosure, a back surface of the transparent display panel of the transparent display device is proximal to the storage space, and the at least one full color light source is located inside the container.

BRIEF DESCRIPTION OF THE DRAWINGS

FIG. 1(a) is a side view of a transparent display device according to an embodiment of the present disclosure;

FIG. 1(b) is a schematic diagram of a structure of a transparent display device according to an embodiment of the present disclosure;

FIG. 2(a) is a side view of another transparent display device according to an embodiment of the present disclosure;

FIG. 2(b) is a schematic diagram of a structure of another transparent display device according to an embodiment of the present disclosure;

DETAILED DESCRIPTION

In order to allow one of ordinary skill in the art to better understand technical solutions of the present disclosure, the present disclosure is described in further detail below in conjunction with the accompanying drawings and specific implementations.

In the related art, a transparent display device includes a transparent display panel based on polymer stabilized liquid crystal (PSLC) or polymer dispersed liquid crystal (PDLC), and a light source is located at and emits light into a side of the transparent display panel This transparent display panel also serves as a light guide plate, and the light is continuously reflected on inner surfaces of the transparent display panel. However, as the light constantly attenuates, display screen in the transparent display panel close to the light source region has a much higher brightness than the display screen far away from the light source region, and uniformity of display is poor. Meanwhile, since a metal wire constructing a TFT in the display panel has a certain slope angle due to a manufacturing process, incident light irradiates on the slope angle and is reflected outward significantly, resulting in high brightness of the non-display region, and a low display contrast ratio.

According to one aspect of the present disclosure, the present disclosure provides a transparent display device, and the transparent display device provided by the present disclosure is described below referring to FIGS. 1 and 2.

Figure 3:
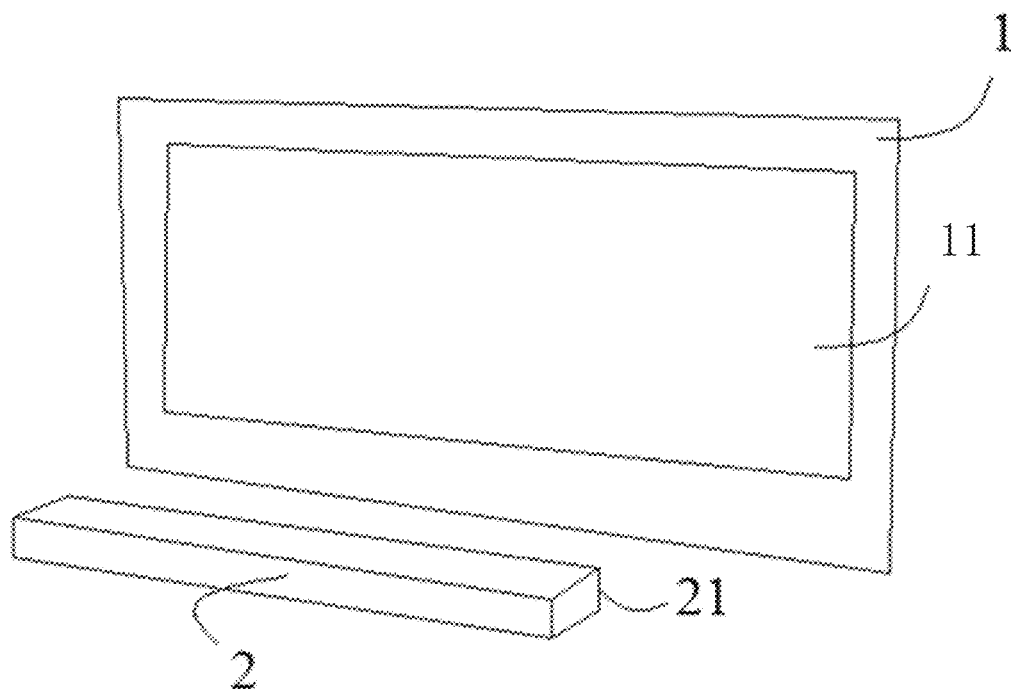
FIG. 3 is a schematic diagram of a structure of yet another transparent display device according to an embodiment of the present disclosure.

Referring to FIGS. 1(a) and 1(b), the transparent display device includes a transparent display panel 1 and a light source 2 for providing backlight to the transparent display panel 1. The transparent display panel 1 includes a first substrate 101 and a second substrate 102 provided opposite to each other, and a polymer liquid crystal mixed layer 103 between the first substrate 1 and the second substrate 2. The first substrate 101 and the second substrate 102 do not include a polarizer and a color filter, the polymer liquid crystal mixed layer 103 is formed of a material of polymer stabilized liquid crystal or polymer dispersed liquid crystal. Along the direction of light emission, the transparent display panel 1 includes a display surface and a back surface opposite to each other, and has a transparent display region 11 (as shown in FIG. 3). The light source 2 is located at the back surface side (e.g., the left side in FIG. 1(a)) of the transparent display panel 1, at oblique upper rear and oblique lower rear of the transparent display panel 1 (i.e., the two black rectangular blocks on the left side of FIG. 1(a) denote the light source 2), respectively, and is spaced apart from the transparent display panel 1. An orthographic projection of the light source 2 on a plane on which the transparent display panel 1 is located is outside of the transparent display region 11. The light source 2 is configured to emit light towards the back surface of the transparent display region 11 of the transparent display panel 1. LED lamps 2 disposed at the oblique upper rear and the oblique lower rear of the transparent display panel are employed as a light source emitting the light, and an optical lens structure of the light source is configured to achieve a bright region, which is casted on the transparent display panel, has a uniform brightness, and has the same shape and size as those of the transparent display region. Thus, compared to a transparent display of side-light-input type, brightness uniformity of the transparent display panel can be increased greatly.

In some embodiments, the light source may be disposed at multiple angles and positions such as upper rear, lower rear, side rear and so on. Referring to FIGS. 2(a) and 2(b), the light source 2 is located at oblique upper rear and underside of the transparent display panel 1 (e.g., the two black rectangular blocks at oblique upper left and the underside shown in FIG. 2(a) denote the light source 2), respectively. The light source located at the oblique upper rear of the transparent display panel 1 has a normal line directed toward a horizontal center line of the transparent display panel 1 (e.g., the horizontal center line of the transparent display panel 1 as shown in FIGS. 1(b) and 2(b)), to improve brightness uniformity of the transparent display panel.

The transparent display device further includes a shading member 4 disposed at an edge of the back surface of the transparent display panel 1, and an orthographic projection of a light exiting surface 21 (as shown in FIG. 3) of the light source 2 on the plane where the back surface of the transparent display panel 1 is located is within an orthographic projection of the shading member 4 on this plane. The shading member 4 blocks the light source 2, so that a user cannot directly see the light exiting surface 21 of the light source 2 at a normal viewing position, that is, from the front side (e.g., the right side in FIG. 2(a)) of the transparent display device.

The liquid crystal material in the transparent display panel 1 is a liquid crystal/polymer mixture (i.e., a mixture of liquid crystal and a polymer) or polymer network liquid crystal. The liquid crystal/polymer mixture may be polymer stabilized liquid crystal or polymer dispersed liquid crystal.

The polymer stabilized liquid crystal PSLC and the polymer dispersed liquid crystal PDLC are both a mixture of liquid crystal and a polymer. The difference between the two lies in that: a mass proportion of the polymer in the polymer stabilized liquid crystal is generally lower than 10%, and when a pixel voltage is not applied to subpixels in the polymer stabilized liquid crystal panel, the light transmittance is high, so a user can see more clearly an object at the back of the polymer stabilized liquid crystal panel; a mass proportion of the polymer in the polymer dispersed liquid crystal is generally higher than 30%, and when a pixel voltage is applied to subpixels in the polymer dispersed liquid crystal panel, the light transmittance is high, so a user can see more clearly an object at the back of the polymer dispersed liquid crystal panel.

In the present embodiment, the transparent display device further includes a drive control circuit 5, which is connected respectively to the light source 2 and the transparent display panel 1, and is used to control a refresh frequency of the light source to be equal to a frequency of a drive voltage data signal of the transparent display panel, that is, to be equal to a screen refresh frequency of the transparent display panel 1. Specifically, the light source 2 includes a full color light source, and provides backlight to the transparent display panel 1 according to a field sequential display mode, that is, only provides backlight of one color to the transparent display panel 1 at each one moment. At each moment, the transparent display panel 1 displays only one color. The known PSLC technology generally employs the field sequential color mode which changes the color of the backlight source at a high speed to achieve color display. It is to be noted that, a response time of the liquid crystal/polymer mixed components must be shorter than a light emitting time of each color in each frame in the field sequential color mode. For example, calculating for a normal display refresh frequency of 60 Hz, the refresh frequency required for field sequential display using three colors RGB is 180 Hz, then a display time of each color is 1000/180=5.56 ms, which requires that, when selecting a liquid crystal/polymer mixed system used in the PLSC technology, a condition of response time smaller than 5.56 ms must be satisfied.

In some embodiments, the full color light source includes a plurality of LED light sources of different colors, and the LED light sources of different colors emit light sequentially. Alternatively, the full color light source includes a LED light source which can emit light of a plurality of different colors, that is, respective LED light sources have a capability of emitting light of different colors, but at a same moment, all the LED light sources only emit light of one color.

In some embodiments, the light source may be any type of projection light source, such as a high pressure gas discharge light source, a LED light source or a laser light source.

In the present embodiment, the light source 2 is a line light source, and an orthographic projection of the line light source on the plane where the back surface of the transparent display panel 1 is located is outside one edge of the back surface of the transparent display region 11. The light source 2 being the line light source 2 is advantageous to consistency of light in one dimension, and advantageous to improving uniformity of display. The line light source 2 is, for example, a light bar including a row of LED lamps (that is, it is a line light source consisting of multiple point light sources). In some embodiments, the line light source 2 is only provided at side rear of one side surface of the transparent display panel 1. That is, only one light bar may be provided at upper side rear of the transparent display panel 1.

In the present embodiment, the light source 2 includes two line light sources 2, wherein an orthographic projection of one line light source 2 on the plane where the back surface of the transparent display panel 1 is located is outside one edge of the back surface of the transparent display region 11, and an orthographic projection of the other line light source 2 on the plane is located outside an opposite edge of that edge.

In some embodiments, the light source 2 is located at left side rear and right side rear of the transparent display panel 1, respectively. Since light is symmetrical in one dimension of the transparent display panel 1, it is possible to further enhance uniformity of display.

In some embodiments, each of the line light sources 2 is parallel to the corresponding edge of the transparent display region 11, this configuration is also for improving uniformity of display.

As shown in FIGS. 2(a) and 2(b), in some embodiments, a distance between each line source 2 and the back surface of the transparent display panel 1 may be about 10 mm. Each line source 2 may have a length of about 170 mm and a width of about 1 mm. The length of each of the line light sources 2 may be equal to a length of the transparent display panel 1. A width of the transparent display panel 1 may be about 110 mm. A distance between the line light source 2 located at the oblique upper rear of the transparent display panel 1 and the top of the transparent display panel 1 may be about 10 mm. These configurations may further improve uniformity of display.

In some embodiments, referring to FIG. 3, the light source 2 is located at a light exiting surface side of the transparent display panel 1.

The transparent display device of the present disclosure employs LED lamps disposed at oblique rear (which may be multiple angles and positions such as oblique upper rear, oblique lower rear, oblique side rear, or the like) of the transparent display panel as a casting light source, which can enable the transparent display panel to have advantages of a high transmittance, a high uniformity of brightness, a high resolution, and an unlimited display size.

It is to be noted that, an angle between the normal line of the light exiting surface 21 of the light source 2 and a normal line of the transparent display panel 1 may be designed flexibly. An optimal angle may be found by using an optical simulation software, so that displaying of the transparent display panel 1 satisfies uniformity requirement.

The transparent display device of the present embodiment may be used in an on-vehicle navigator. The transparent display panel of the on-vehicle navigator may be placed between a steering wheel and a front windshield, the light source of the on-vehicle navigator may be placed at an edge position of the windshield. A driver can see both the navigation screen displayed on the on-vehicle navigator and the traffic situation in front of the vehicle through the navigation screen.

According to another aspect of the present disclosure, the present embodiment provides a container, having a storage space for accommodating an object 3, the container further includes the transparent display device according to the present disclosure, and the back surface of the transparent display panel 1 of the transparent display device proximal to the storage space, such that the storage space is visible from outside of the container through the transparent display panel 1, and the light source is disposed inside the container.

Figure 4:
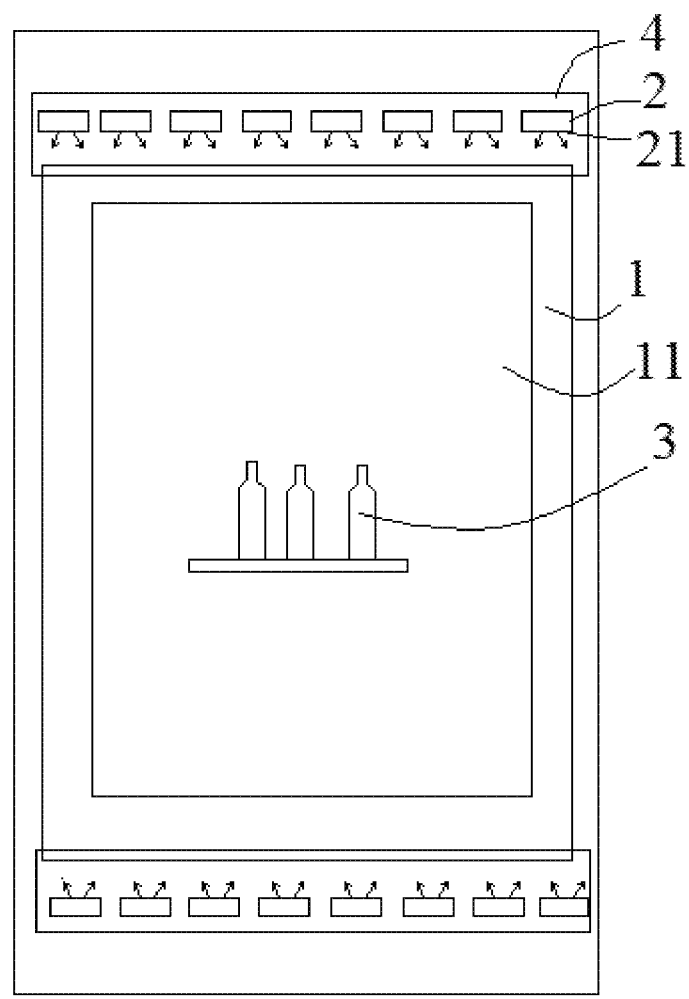
FIG. 4 is a main view of a container according to an embodiment of the present disclosure.
Figure 5:
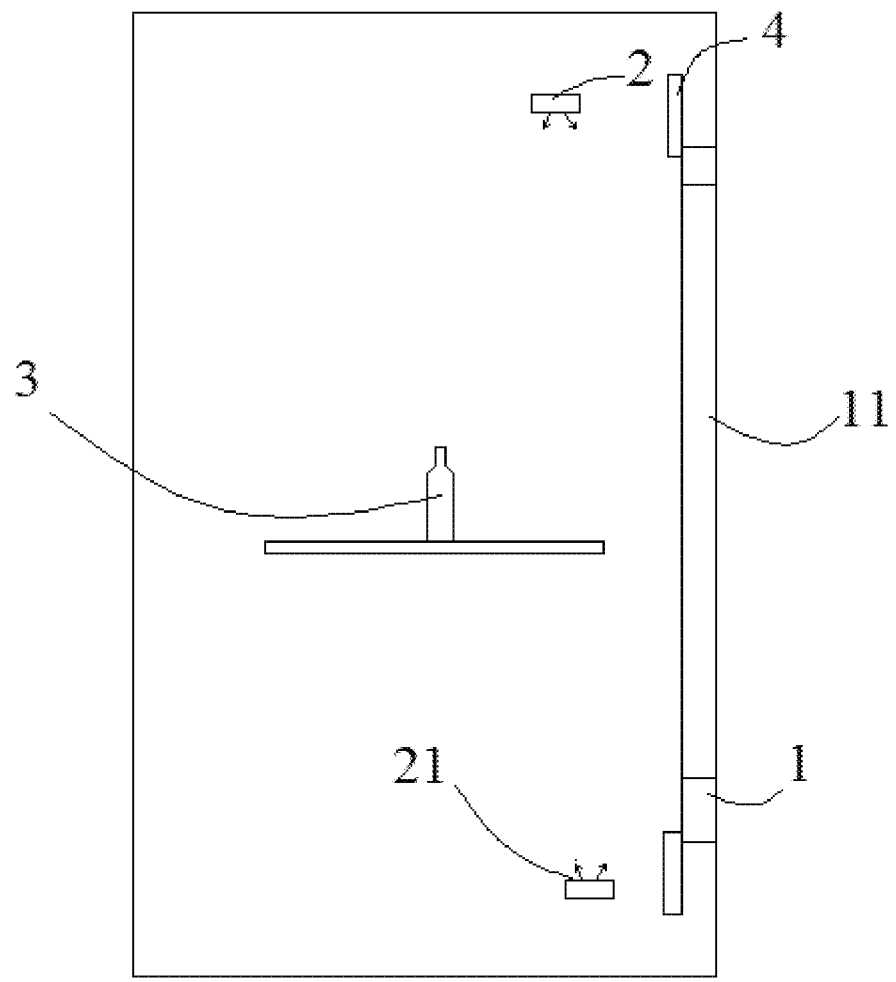
FIG. 5 is a side view of the container shown in FIG. 4.

Referring to FIGS. 4 and 5, a display surface is a surface for displaying a screen to a user and is proximal to the user, for example, a surface on the right side of the transparent display panel 1 in FIG. 5 is the display surface. A surface of the transparent display panel 1 opposite to the display surface is a back surface, for example, a surface of the transparent display panel 1 proximal to the object 3 in FIG. 5 is the back surface.

A transparent display region 11 is a region which is transparent and capable of displaying a screen, and in engineering is also referred to as an active area (AA region). A pixel structure is provided in the transparent display region 11 of the transparent display panel 1, as is known by one of ordinary skill in the art.

A light source 2 is located at a back surface side of the transparent display panel 1, and provides backlight to the transparent display panel 1 from the back surface of the transparent display panel 1. An orthographic projection of the light source 2 on the plane where the back surface of the transparent display panel 1 is located is outside the back surface of the transparent display region 11. That is, the light source 2 is located at side rear (such as upper side rear, left side rear, lower side rear, and/or right side rear) of the transparent display region 11. A normal line of a light exiting surface of the light source 2 is directed toward a center line of the transparent display region 11 (e.g., a center line perpendicular to the plan view of the transparent display area 11 shown in FIG. 5), the center line of the transparent display region 11 is parallel to a direction in which the light source 2 is arranged along a side of the transparent display panel 1. As such, light emitted towards the back surface of the transparent display panel 1 is emitted into the transparent display panel 1 at a certain inclination angle with respect to the back surface of the transparent display panel 1. Compared to a display method in which light is incident from one side surface of the transparent display panel 1 (i.e., light propagates by total internal reflection inside the transparent display panel 1), in the present disclosure, there is no loss of light before it illuminates pixels of the display region of the transparent display panel 1, thus uniformity of display is maximally increased.

Meanwhile, since the light source 2 is located at side rear, instead of direct rear (or middle rear), of the transparent display region 11, the light source 2 is not seen behind the transparent display region 11 when directly viewed from outside. That is, the light source 2 does not affect the "transparency" of the transparent display region 11.

The transparent display device may be used to display, for example, information such as a status of the object 3 in the container. The light source therein provides backlight to the transparent display panel 1 while also providing illumination to the object inside the storage space, thereby providing the user with better experience. The transparent display panel 1 is, for example, disposed in an opening of a sidewall of the container.

Optionally, the container is any one of a refrigerator, a show window, a vending machine, and the like.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A transparent display device, comprising:
a transparent display panel, comprising:
a first substrate and a second substrate provided opposite to each other;
a polymer liquid crystal mixed layer, located between the first substrate and the second substrate; and
at least one full color light source, located at a side of the first substrate distal to the second substrate, an orthographic projection of the at least one full color light source on a plane here the first substrate is located is outside the first substrate, and the at least one full color light source is configured to emit light of at least two colors toward the transparent display panel in a time division manner;
wherein the at least one full color light source is a LED line light source, and an orthographic projection of the LED line light source on the plane where the first substrate is located is outside an outermost side edge of the first substrate;
wherein the at least one full color light source comprises two LED line light sources provided opposite to each other, an orthographic projection of one of the LED line light sources on the plane where the first substrate is located is outside one outermost side edge of the first substrate, and an orthographic projection of the other of the LED line light sources on the plane where the first substrate is located is outside an outermost side edge opposite to the one outermost side edge; and
the transparent display device further comprises a drive control circuit, which is connected to the at least one fill color light source and the transparent display panel, and is configured to control a refresh frequency of the at least one full color LED light source to be equal to a frequency of a drive voltage data signal of the transparency display panel.

2. The transparent display device according to claim 1, wherein a normal line of a light exiting surface of the at least one full color light source is directed toward a center line of the transparent display panel, and the center line of the transparent display panel is parallel to a direction in which the at least one full color light source is arranged along a side of the transparent display panel.

3. The transparent display device according to claim 1, further comprising at least one shading member provided correspondingly to the at least one full color light source, wherein the at least one shading member is disposed at a side of the transparent display panel proximal to the respective one of the at least one full color light source, and an orthographic projection of the at least one full color light source on the plane where the first substrate is located is within an orthographic projection of the at least one shading member on this plane, respectively.

4. The transparent display device according to claim 3, wherein each of the at least one full color light source comprises a plurality of LED light sources of different colors, or an LED light source emitting light of a plurality of different colors.

5. The transparent display device according to claim 4, wherein the polymer liquid crystal mixed layer comprises polymer stabilized liquid crystal or polymer dispersed liquid crystal, and a response time of the polymer stabilized liquid crystal or the polymer dispersed liquid crystal is smaller than a light emitting time of each color in each frame in a field sequential display mode.

6. A container, comprising a storage space for accommodating an object, wherein the container further comprises the transparent display device according to claim 1, a back surface of the transparent display panel of the transparent display device is proximal to the storage space, and the at least one full color light source is located inside the container.

* * * * *